Patented Feb. 19, 1952

2,586,341

UNITED STATES PATENT OFFICE 2,586,341

PROCESS FOR PRODUCING TRANS-3-PENTENOIC ACID

Archibald M. Hyson, Wilmington, Del., assignor to E. I. du Pont de Nemours and Company, Wilmington, Del., a corporation of Delaware No Drawing. Application October 14, 1950, Serial No. 190,255

5 Claims. (Cl. 260—533)

This invention relates to a process for the production of trans-pentenoic acid from butadiene, carbon monoxide and water in accordance with the equation $$CH_2=CHCH=CH_2 + CO + H_2O \rightarrow CH_3CH=CHCH_2CO_2H$$

Attempts have been made heretofore to prepare simple organic carboxylic acids by reaction between butadiene, carbon monoxide and water. In general, these attempts have not been successful because of the formation of polymeric products including butadiene dimer and complex mixtures of relatively high molecular weight acids derived therefrom.

An object of this invention is to provide a process for preparing relatively simple organic acids from butadiene, carbon monoxide and water. A further object is to provide a process for preparing trans-3-pentenoic acid. Other objects of the invention will appear hereinafter.

In accordance with the process of this invention trans-3-pentenoic acid is prepared by heating butadiene with carbon monoxide and water in the presence of a compound of the class consisting of dimethylformamide and dimethylacetamide, and a cobalt carbonyl catalyst at a temperature within the range of 100° to 250° C. under a pressure of at least 700 atmospheres. In a preferred embodiment the temperature is maintained within the range of 120° to 165° C. and the pressure is not less than 1500 atmospheres nor more than 5000 atmospheres. The quantity of water which may be present in the reaction mixture, if best results are to be obtained, must be carefully controlled. At temperatures within the range of 120° to 140° C. the number of mols of water should not be greater than the number of mols of butadiene in the reaction mixture. When, at these relatively low temperatures, the molar quantity of water is in excess of the molar quantity of butadiene the formation of trans-pentenoic acid is very seriously retarded, evidently because of an inhibiting effect of excessive amounts of water. However, a considerably higher water concentration can be tolerated at a temperature of about 160° C., at which temperature maximum conversions to trans-3-pentenoic acid are obtained. At higher temperatures still larger amounts of water can be tolerated, but the conversion of butadiene to trans-3-pentenoic acid is less selective at these excessively high temperatures.

The quantities of the other constituents in the reaction mixture can be varied rather widely. For example, the quantity of cobalt tetracarbonyl catalyst is not particularly critical, a sufficient quantity for excellent results being about 0.1 to 0.5 part by weight per part of butadiene. The quantity of dimethylformamide (and/or dimethylacetamide) also may be varied over a very wide range, a convenient and suitable quantity being about 2 to 20 parts by weight per part of butadiene.

While it is generally preferred to introduce controlled amounts of water either initially or while the formation of trans-pentenoic acid is taking place, it is also possible to carry out the desired reaction even in the absence of water from an external source. The reason for this evidently is that a small amount of water is produced by synthesis from carbon monoxide and other ingredients of the reaction mixture.

The invention is illustrated further by means of the following examples.

*Example 1.—Synthesis of trans-3-pentenoic acid without added water (dimethylformamide diluent)*

Into a 200 ml.-capacity silver-lined rocker tube from which all but traces of air were excluded by nitrogen was placed 10 grams (0.19 mol) butadiene, 90 grams dimethylformamide, 2 grams cobalt carbonyl, and 1 gram hydroquinone. The tube was pressured to 45,000 pounds per square inch with carbon monoxide and heated at 140° C. for 30 minutes. A pressure drop of 3000 pounds per square inch was observed. The contents of the tube was discharged and the homogeneous dark colored liquid was distilled at diminished pressure. A four run composite (initial charge as indicated above) was flash distilled at 50° to 170° C. and 3 to 6 mm. leaving a polymeric residue of 22.2 grams (percent nitrogen—0.0). The distillate was redistilled with a high reflux ratio through an ordinary Vigreux type column. The following fractions were collected.

| Cut No. | B. P., °C. | Wt. in Grams | $n_D^{27}$ |
|---|---|---|---|
| (1) | 26–30/3 mm | 14.0 | |
| (2) | 31–51/3 mm | 2.0 | |
| (3) | 53–58/4 mm | 2.0 | 1.4395 |
| (4) | 54–52/2–1.5 mm | 2.4 | 1.4434 |
| (5) | 52–53/1.5 mm | 6.3 | 1.4410 |
| (6) | 53–50/1.5–1 mm | 7.0 | 1.4428 |
| (7) | 50–55/1 mm | 3.5 | 1.4560 |
| (8) | 55–51/1 mm | 4.7 | 1.4630 |
| (9) | 56–66/1 mm | 2.0 | 1.4690 |
| (10) | 84–89/1 mm | 2.0 | 1.4980 |
| (11) | 93–120/1 mm | 2.3 | 1.5110 |
| (12) | 140–150/1 mm | 2.0 | |

Analytical results on selected cuts were as follows:

| Analysis | Cut No. (5) | Cut No. (6) | Cut No. (8) | Cut No. (12) |
|---|---|---|---|---|
| Per Cent nitrogen | 1.86, 1.77 | 0.23 | 5.76 | 0.34 |
| Per Cent carbon | 53.0, 52.3, 53.3 | 59.7, 59.4 | 57.4 | |
| Per Cent hydrogen | 7.21, 6.94, 7.04 | 7.63, 7.92 | 8.23 | |
| Carbonyl No. | 47.3 | 74.2, 75.1 | 42.7 | 80.2 |
| Molecular wt. | | 109 | | |
| Acid No. | | 485 | | |

The analytical results on cut (6) approximate the predicted values for a pentenoic acid. (Calculated for $C_5H_8O_2$: Percent C—59.98; H—8.05. Mol. wt., 100. Acid No. 561.) Infrared studies on cut (6) showed that non-terminal —CH=CH— was present; no terminal unsaturation or branching at the double bond was evident; furthermore, the infrared analysis showed that configuration about the double bond was trans.

*Example 2.—Synthesis of trans-3-pentenoic acid with added water (dimethylformamide diluent)*

In a 200 ml.-capacity silver-lined rocker tube from which all but traces of air were excluded by nitrogen was placed 10 grams (0.19 mol) butadiene, 3.4 grams (0.19 mol) water, 90 grams dimethylformamide, 2 grams cobalt carbonyl and 1 gram hydroquinone. The tube was pressured to 45,000 pounds per square inch with carbon monoxide and heated at 160° to 162° C. for 15 minutes. A pressure drop of 1000 pounds per square inch was observed. The contents of the tube after discharge was distilled at diminished pressure. A total of 23.6 grams of distillate was collected, B. P. 55°–92°/2 to 7 mm. Gas was evolved during the distillation due to the decomposition of either cobalt carbonyl or other soluble cobalt complex. The acid number on this distillate was 374 which calculated as a pentenoic acid gave an acid concentration of 66.7% or 15.7 grams. On the basis of these figures, the indicated conversion of butadiene to pentenoic acid was 85%.

A composite of products (six runs each similar to that described above) was made. This composite was composed of once-distilled material boiling in the pentenoic acid range and free from carbonyl impurities. The composite was redistilled carefully through a Vigreux type column and the following fractions collected.

| Cut No. | B. P., °C. | Wt. in Grams | $n_D^{25}$ | Acid No. | Iodine No. |
|---|---|---|---|---|---|
| (1) | 36–50.5/2 to 3 mm | 15.2 | 1.4275 | | |
| (2) | 50.5–53.5/1 to 2 mm | 4.2 | 1.4370 | | |
| (3) | 53.5–50/1 mm | 10.0 | 1.4390 | 438 | |
| (4) | 53.5–54/0.5 mm | 9.3 | 1.4350 | 532 | 223 |
| (5) | 54–55/0.5 mm | 15.5 | 1.4350 | | |
| (6) | 55–63.5/0.5 mm | 5.4 | 1.4430 | | |
| (7) | 63.5–64.5/0.5 mm | 7.6 | 1.4592 | 432 | 211 |
| (8) | 64.5–75/0.5 to 2 mm | 6.0 | 1.4612 | | |

Infrared studies were made on cuts (3), (4) and (7). In all three cases the non-terminal structure (—CH=CH—) was definitely shown to be present. In addition the configuration at the double bond was shown to be trans. In order to distinguish between trans-2 and trans-3-pentenoic acid, cut (4) was subjected to ozonolysis at 0° C. in chloroform solution. After ozonization, the chloroform was removed at 0° C. and diminished pressure. The residue, consisting of unreacted pentenoic acid plus its ozonide, was treated with cold water and allowed to stand at room temperature for 2½ days. The aqueous solution was then distilled and all distillate up to the boiling point of pure water was collected. The Dry Ice trap used in the distillation was found to contain a low boiling liquid. Both these fractions readily gave a 2,4-dinitrophenylhydrazone on treatment with alcoholic 2,4-dinitrophenylhydrazine. In each case the compound was identified as the 2,4-dinitrophenylhydrazone of acetaldehyde. No propionaldehyde could be detected. Cut (5) by reference to boiling point and refractive index appeared to be the same acid, equivalent in quality to cut (4), while cut (3) was also the same acid plus a small amount of lower boiling impurity. Hence, the major product from the reaction of butadiene, carbon monoxide and water was shown to be trans-3-pentenoic acid.

*Example 3.—Synthesis of trans-3-pentenoic acid using dimethylacetamide as diluent*

A mixture consisting of 10 grams butadiene, 87 grams dimethylacetamide, 1.0 gram hydroquinone, and 2 grams cobalt carbonyl was heated at 140° to 144° C. with carbon monoxide under 45,000 pounds per square inch for 30 minutes. Distillation of the reaction mixture gave about 4 grams of trans-3-pentenoic acid, and 11 grams of higher molecular weight products.

It is to be understood that the foregoing examples are illustrative only and that numerous methods for practicing the invention will occur to those who are skilled in the art. However, similar results were repeatedly not obtained using monomethylformamide, and numerous other organic solvents, in combination with cobalt carbonyl under the reaction conditions herein disclosed. Alcoholic solvents such as methanol, ethanol, isopropanol, n-butanol, and methyl glycol ether led to the formation of polymeric products. When ammonia was employed in place of dimethylformamide a sponge-like rubbery polymer was obtained. A polymeric product was also obtained in the reaction between butadiene, carbon monoxide and formamide in the presence of cobalt carbonyl.

The trans-3-pentenoic acid obtained in the practice of this invention is useful as an intermediate for the manufacture of other substances. It can be converted to n-pentanol-1 by hydrogenation, and it is thus a source material for the manufacture of ester solvents, etc.

I claim:

1. A process for preparing trans-3-pentenoic acid which comprises heating butadiene with carbon monoxide and water in the presence of a compound of the class consisting of dimethylformamide and dimethylacetamide and a cobalt carbonyl catalyst at a temperature within the range of 100° to 250° C. under a pressure of at least 700 atmospheres whereby trans-3-pentenoic acid is formed, the quantity of water present in the reaction mixture being less than one mol per mol of butadiene when the temperature does not exceed 165° C., and thereafter separating the said trans-3-pentenoic acid from the resulting mixture.

2. A process for preparing trans-3-pentenoic acid which comprises heating butadiene with carbon monoxide and water in the presence of a compound of the class consisting of dimethylformamide and dimethylacetamide and a cobalt carbonyl catalyst at a temperature within the range of 120° to 165° C. under a pressure within the range of 1500 to 5000 atmospheres whereby trans-3-pentenoic acid is formed, the quantity of water present in the reaction mixture being less than one mol per mol of butadiene, when the temperature does not exceed 165° C., and thereafter separating the said trans-3-pentenoic acid from the resulting mixture.

3. The process of claim 2 in which the temperature is within the range of 120° to 140° C. and the quantity of water present in the reaction mixture is less than one mol per mol of butadiene, while the reaction between butadiene, water and carbon monoxide is taking place.

4. A process for preparing trans-3-pentenoic acid which comprises heating butadiene with carbon monoxide and water in the presence of from 2 to 20 parts by weight of dimethylformamide per part of butadiene, and in the presence also of from 0.1 to 0.5 parts by weight of cobalt tetracarbonyl per part of butadiene at a temperature within the range of 120° to 165° C. under a pressure within the range of 1500 to 5000 atmospheres, whereby trans-3-pentenoic acid is formed, the quantity of water in the reaction mixture being less than one mol per mol of butadiene, and thereafter separating the said trans-3-pentenoic acid from the resulting mixture.

5. A process for preparing trans-3-pentenoic acid which comprises heating butadiene with carbon monoxide and water in the presence of from 2 to 20 parts of dimethylformamide per part of butadiene, and in the presence also of from 0.1 to 0.5 parts of cobalt tetracarbonyl catalyst per part of butadiene at a temperature within the range of 120° to 140° C. under a pressure within the range of 1500 to 5000 atmospheres, the mixture of water present in the reaction mixture being not greater than one mol per mol of butadiene, whereby trans-3-pentenoic acid is obtained, and thereafter separating the said trans-3-pentenoic acid from the resulting mixture.

ARCHIBALD M. HYSON.

REFERENCES CITED

The following references are of record in the file of this patent:

UNITED STATES PATENTS

| Number | Name | Date |
| --- | --- | --- |
| 1,973,662 | Schalch | Sept. 11, 1934 |
| 2,386,927 | Boyd | Oct. 16, 1945 |
| 2,448,368 | Gresman et al. | Aug. 31, 1948 |
| 2,448,375 | Larson | Aug. 31, 1948 |
| 2,510,105 | Hedberg | June 6, 1950 |

OTHER REFERENCES

Peck et al.: "Interview with Dr. J. W. Reppe," Fiat Final Report No. 273, October 2, 1945, pp. 9–12.